(12) United States Patent
DiCesare

(10) Patent No.: US 7,275,296 B2
(45) Date of Patent: Oct. 2, 2007

(54) METHOD FOR FORMING A FRAME ASSEMBLY

(75) Inventor: John DiCesare, Bowling Green, KY (US)

(73) Assignee: Magna Structural Systems, Inc., Aurora, Ontairo (CA)

( * ) Notice: Subject to any disclaimer, the term of this patent is extended or adjusted under 35 U.S.C. 154(b) by 0 days.

(21) Appl. No.: 10/975,937

(22) Filed: Oct. 29, 2004

(65) Prior Publication Data

US 2006/0091701 A1   May 4, 2006

(51) Int. Cl.
*B23Q 3/00*   (2006.01)

(52) U.S. Cl. .......................... 29/464; 29/463; 29/467; 29/897.2

(58) Field of Classification Search ............... 29/897.2, 29/463, 464, 467; 72/327, 333–335; 296/29
See application file for complete search history.

(56) References Cited

U.S. PATENT DOCUMENTS

| | | | |
|---|---|---|---|
| 2,467,516 A * | 4/1949 | Almdale | 219/94 |
| 2,883,232 A * | 4/1959 | Olley et al. | 296/204 |
| 3,344,370 A | 9/1967 | Sewell | |
| 3,508,784 A | 4/1970 | Small | |
| 4,014,588 A | 3/1977 | Kohriyama | |
| 4,135,757 A | 1/1979 | Smith et al. | |
| 4,271,921 A | 6/1981 | Ochsner | |
| 4,819,980 A | 4/1989 | Sakata et al. | |
| 5,139,361 A | 8/1992 | Camuffo | |
| 5,176,417 A | 1/1993 | Bauer | |
| 6,010,155 A * | 1/2000 | Rinehart | 280/781 |
| 6,017,073 A | 1/2000 | Lindblom et al. | |
| 6,138,357 A * | 10/2000 | Jones | 29/897.2 |
| 6,186,696 B1 | 2/2001 | Valin | |
| 6,394,537 B1 | 5/2002 | Derees | |
| 6,543,828 B1 | 4/2003 | Gass | |

FOREIGN PATENT DOCUMENTS

JP   4-11582   1/1992

* cited by examiner

*Primary Examiner*—David P. Bryant
*Assistant Examiner*—Sarang Afzali
(74) *Attorney, Agent, or Firm*—Pillsbury Winthrop Shaw Pittman LLP

(57) ABSTRACT

A frame assembly for a motor vehicle includes a tubular frame and a support tube. The tubular frame includes a first portion connected to a second portion. The first and second portions define a hollow cavity therebetween. A support tube is positioned within the hollow cavity between the first and second portions. The support tube has an exterior surface. The first and second portions include first and second indents respectively formed therein. The first and second indents engage the exterior surface of the support tube to secure the support tube between the first and second portions.

9 Claims, 3 Drawing Sheets

METHOD FOR FORMING A FRAME ASSEMBLY

BACKGROUND OF THE INVENTION

Field of the Invention

The present invention relates to motor vehicle frame. More specifically, the present invention relates to motor vehicle frame including a support tube.

SUMMARY OF THE INVENTION

One aspect of the invention relates to a frame member assembly for a motor vehicle having a tubular member including a first portion connected to a second portion, the first and second portions defining a hollow cavity therebetween; and a support tube positioned within the hollow cavity between the first and second portions, the support tube having an exterior surface, wherein the first and second portions include first and second indents, respectively, the first and second indents extending within the hollow cavity and engaging the exterior surface of the support tube to secure the support tube between the first and second portions.

Another aspect of the invention relates to a method for forming a frame assembly, the method including: providing a first portion having a first indent formed therein, a second portion having a second indent formed therein, and a support tube having an exterior surface; engaging the support tube with a selected one of the first portion and the second portion such that the indent of the selected one of the first and second portions engages the exterior surface of the support tube; engaging the first portion with the second portion to connect the first and second portions to one another to form a tubular member; and engaging the support tube with the other of the first and second portions such that the respective indent of the other of the first and second portions engages the exterior surface of the support tube, the first and second indents engaging the exterior surface of the support tube to secure the support tube between the first and second portions.

Yet another aspect of the invention relates to a frame assembly for a motor vehicle. The frame assembly includes a tubular frame member including a first member portion connected to a second member portion. The first and second member portions define a hollow cavity therebetween. A support tube is positioned within the hollow cavity between the first and second member portions. The frame member assembly also includes means for securing the support tube between the first and second member portions.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
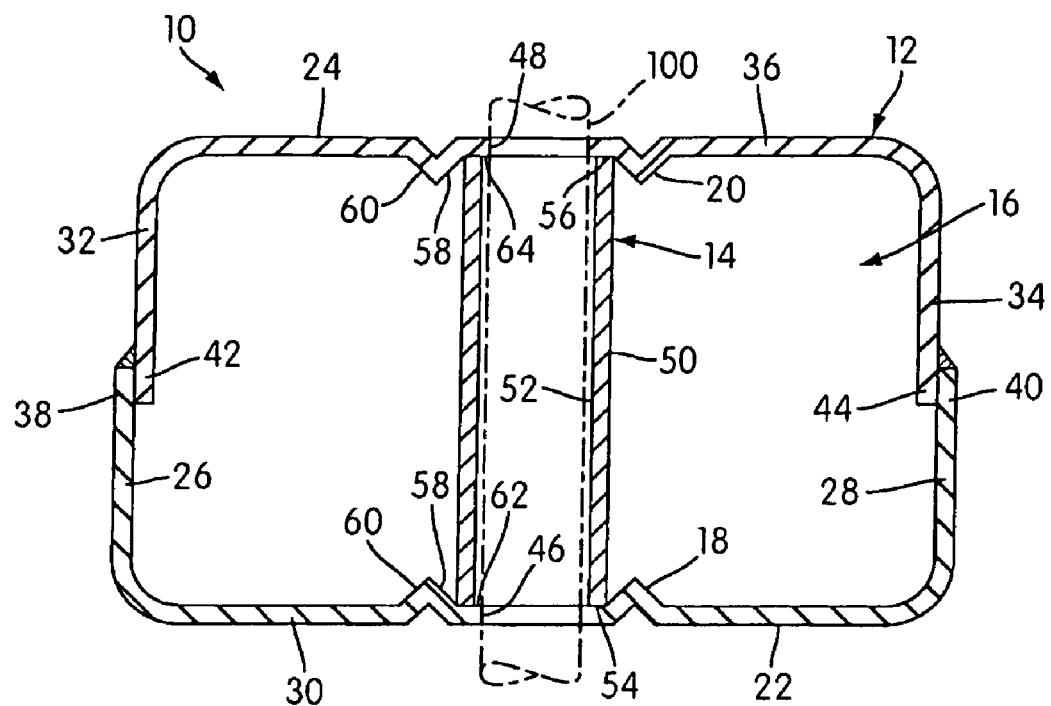
FIG. 1 is a cross-sectional view illustrating a frame assembly constructed in accordance with an embodiment of the invention.

FIG. 1 illustrates a frame assembly 10 for a motor vehicle constructed according to an embodiment of the present invention. The frame assembly 10, as illustrated, shows a frame assembly in the form of, for example, a side rail member of a space frame for an automobile. Although it should be understood that the frame assembly 10 can be used for any appropriate tubular member needing added support from an interior support element such as a support tube or an element to provide guidance and support for a fastener extending through a tubular member. The frame member assembly 10 may be incorporated into any suitable section of the vehicle frame, and the frame member assembly 10 may be utilized on any suitable motor vehicle.

The frame member assembly 10 includes a longitudinally extending tubular frame member 12 and a support tube 14 positioned within the hollow cavity 16 of the tubular frame member 12. As will be discussed in greater detail below, the support tube 14 is secured within the frame member 12 by pre-formed indents 18, 20 provided in opposing walls of the frame member 12.

In the illustrated embodiment, the tubular frame member 12 is formed from first and second generally U-shaped member portions 22, 24 that are rigidly connected to one another, e.g., by welding. Thus, each member portion 22, 24 forms a longitudinal half of the completed tubular frame member 12.

Each member portion 22, 24 is formed separately from an elongated piece of sheet metal, e.g., high strength steel. The sheet metal is bent into the desired shape of each member portion 22, 24 by a stamping operation. However, the sheet metal may be bent into the desired shape of each member portion 22, 24 in any other suitable manner.

One piece of sheet metal is bent into a generally U-shaped configuration to provide the member portion 22 with opposing side walls 26, 28 and a central wall 30 extending between the side walls 26, 28. Similarly, another piece of sheet metal is bent into a generally U-shaped configuration to provide the member portion 24 with opposing side walls 32, 34 and a central wall 36 extending between the side walls 32, 34. As illustrated, the side walls 26, 28 are substantially perpendicular to the central wall 30, and the side walls 32, 34 are substantially perpendicular to the central wall 36. Further, the central wall 30 of the first member portion 22 is longer than the central wall 36 of the second member portion 24. This arrangement allows the ends 38, 40 of the side walls 26, 28 to overlap and engage the ends 42, 44 of the side walls 32, 34 when the member portions 22, 24 are engaged with one another to form the tubular frame member 12. The engaged ends 38, 40, 42, 44 can then be rigidly connected to one another, e.g., by welding together the engaged ends 38, 40, 42, 44 with welding seams that extend the length of the frame member 12.

An aperture 46 is provided in a central section of the central wall 30 of the member portion 22, and an aperture 48 is provided in a central section of the central wall 36 of the member portion 24. In the illustrated embodiment, the apertures 46, 48 have a substantially circular configuration, and are axially aligned with one another when the member portions 22, 24 are connected to one another to form the frame member 12. However, the apertures 46, 48 may have any other suitable configuration, e.g., non-circular. As illustrated in FIG. 1, the apertures may be formed for receiving a fastener 100, that extends through the assembly 10, e.g., to attach another element to the assembly 10.

The apertures 46, 48 in the member portions 22, 24 may be pierced in a piercing operation that is an integral part of the stamping operation. However, the apertures 46, 48 may be formed in a piercing operation that is separate from the stamping operation, e.g., laser cut.

Moreover, the central wall 30 of the member portion 22 includes indent 18, and the central wall 36 of the member portion 24 includes indent 20. The indents 18, 20 surround respective apertures 46, 48, and cooperate to secure the support tube 14 between the member portions 22, 24 and adjacent the apertures 46, 48.

Figure 2:
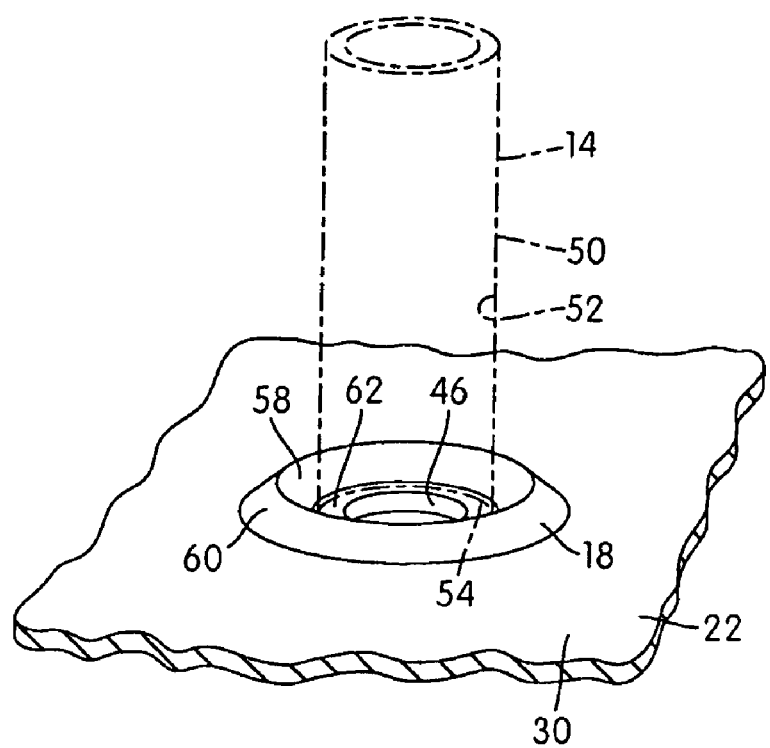
FIG. 2 is a perspective view illustrating a support tube and a portion of the frame assembly shown in FIG. 1, the member portion including an indent that supports the support tube adjacent an aperture in the portion.

In the illustrated embodiment, the indents 18, 20 are structured such that they have a shape that substantially corresponds to a shape of the support tube 14. As best shown in FIGS. 1 and 2, the support tube 14 is tubular and includes a cylindrical exterior surface 50, a cylindrical interior surface 52, and substantially flat end surfaces 54, 56. The indents 18, 20 are in the form of annular protrusions. The support tube 14 is secured between the member portions 22, 24 such that it extends in surrounding relation to the apertures 46, 48 with the open ends of the support tube 14 axially aligned with the apertures 46, 48. Moreover, the indents 18, 20 abut the exterior surface 50 of the support tube 14 to align the support tube 14 with the apertures 46, 48, and maintain the support tube 14 in place.

Thus, the inside diameter of the support tube 14 is greater than the diameter of the apertures 46, 48, and the outside diameter of the support tube 14 is less than the inner diameter of the indents 18, 20. This allows the support tube 14 to extend coaxially around the apertures 46, 48, and extend coaxially within the indents 18, 20.

Specifically, the annular-shaped indents 18, 20 extend coaxially around the respective aperture 46, 48. As illustrated in FIGS. 1 and 2, the indents 18, 20 each have an inclined inner surface 58 and an inclined outer surface 60. The inner edge of the inner surface 58 is spaced from the edge of the respective aperture 46, 48 to define a gap therebetween. The gaps between the indents 18, 20 and the respective apertures 46, 48 define substantially flat support surfaces 62, 64. In use, the end surfaces 54, 56 of the support tube 14 engage against respective support surfaces 62, 64, and the exterior surface 50 of the support tube 14 is engaged with the inner surface 58 of respective indents 18, 20. In one embodiment, the inner edge of the inner surface 58 engages the exterior surface 50 of the support tube 14. In another embodiment, the exterior surface 50 of the support tube 14 is adjacent to the inner edge of the inner surface 58. However, the indents 18, 20 may have any suitable arrangement to the trap the support tube 14 between the member portions 22, 24, and adjacent to the apertures 46, 48. Moreover, the member portions 22, 24 trap the support tube 14 between the member portions 22, 24 without the use of any post welding or nail-piercing operations.

Figure 6:
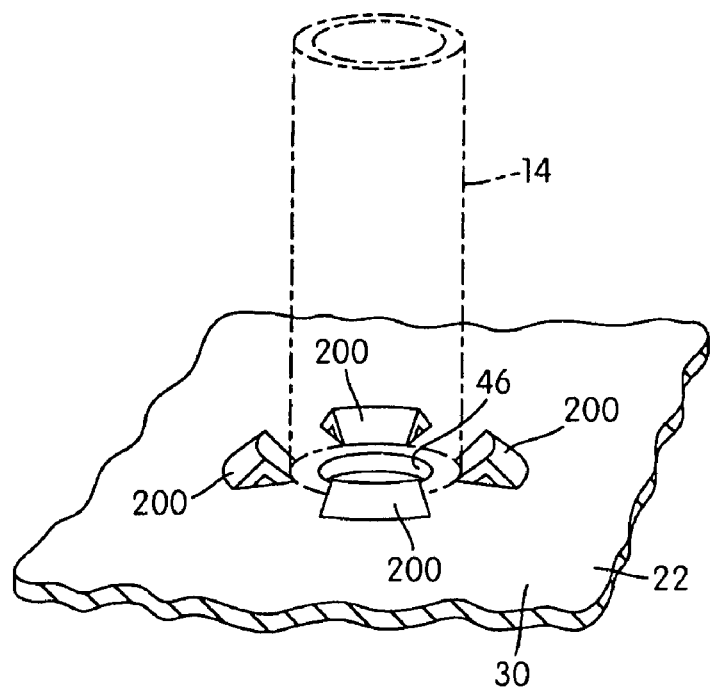
FIG. 6 is a perspective view illustrating a support tube and another embodiment of a portion of the frame assembly.

The annular-shaped indents 18, 20 are only exemplary, and are not intended to be limiting. For example, as shown in FIG. 6, the indents 18, 20 may be in the form of a series of spaced apart protrusions 200 that extend annularly around the respective aperture 46, 48. Also, the indents 18, 20 may have any other suitable configuration, e.g., non-circular plan-form configuration, in order to trap any suitably shaped support tube. That is, the support tube may have a non-circular cross-sectional configuration and the indents may be structured to provide surfaces that secure the support tube in place such that the support tube extends in surrounding relation to apertures formed in the member portions 22, 24.

The indents 18, 20 in the member portions 22, 24 may be formed during the stamping operation that forms the walls of the member portions 22, 24. However, the indents 18, 20 may be formed in any other suitable manner.

In use, the support tube 14 functions as a fastener guide by guiding a fastener 100 through opposing apertures 46, 48. Moreover, the support tube 14 serves as reinforcement to the frame member 12 at such location. Thus, the support tube 14 can accept fasteners such as fastener 100 therethrough without the risk of collapsing the frame member 12.

Figure 3:
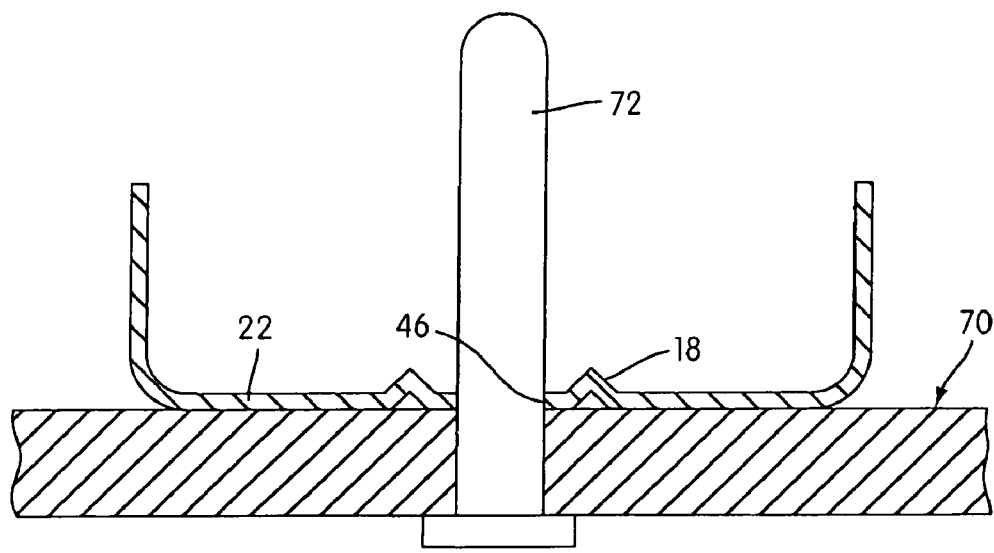
FIG. 3 is cross-sectional view illustrating a first portion engaged with a fixture assembly.
Figure 4:
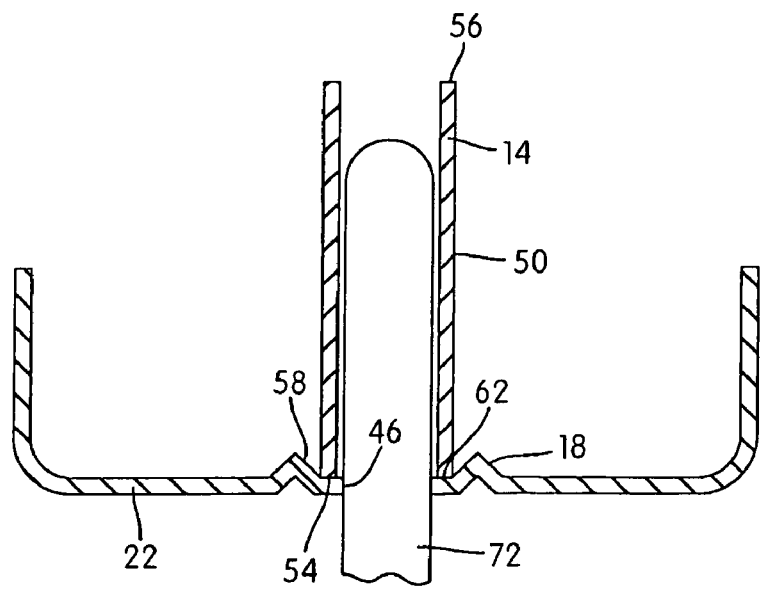
FIG. 4 is cross-sectional view illustrating a support tube engaged with the first portion shown in FIG. 3.
Figure 5:
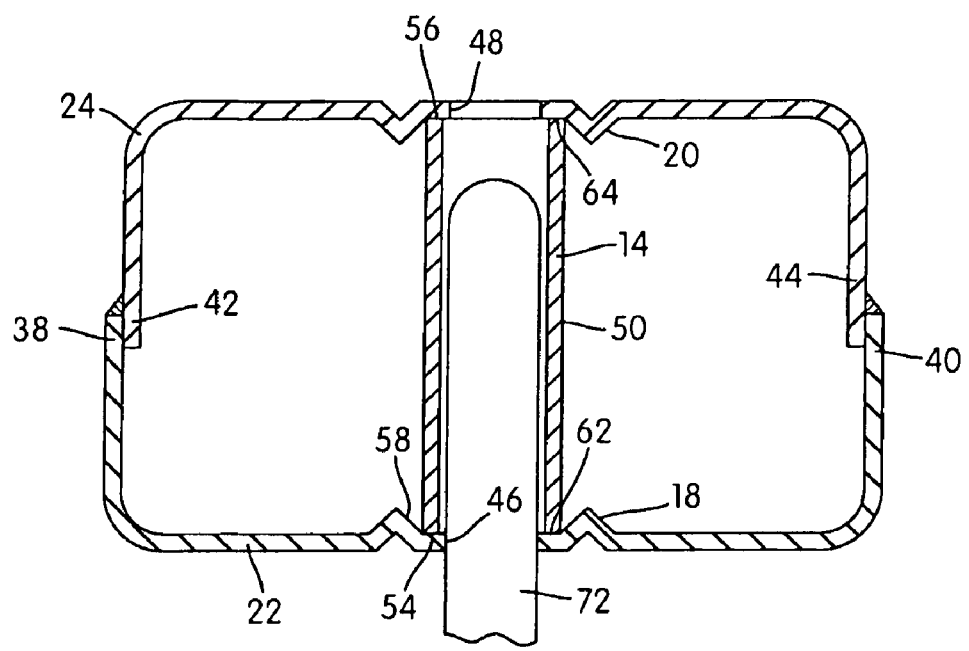
FIG. 5 is a cross-sectional view illustrating a second portion engaged with the support tube and the first portion shown in FIG. 4.

FIGS. 3-5 illustrate the method for forming the frame member assembly 10 in accordance with an embodiment of the invention. In the illustrated embodiment, the member portions 22, 24 are pre-formed by a stamping operation wherein the member portions 22, 24 are provided with apertures 46, 48 and indents 18, 20 surrounding the apertures 46, 48, respectively.

As shown in FIG. 3, the first member portion 22 is initially engaged with a fixture assembly 70 such that a fixture pin 72 of the fixture assembly 70 protrudes through the aperture 46 in the first member portion 22.

As shown in FIG. 4, the support tube 14 is loaded over the fixture pin 72 so that the end surface 54 of the support tube 14 engages the support surface 62 of the first member portion 22, and the exterior surface 50 of the support tube 14 engages the indent 18. This positions the support tube 14 between the fixture pin 72 and the indent 18 provided in the first member portion 22. The inner surface 58 of the indent 18 is angled, which helps to guide the support tube 14 into its operative position wherein it extends coaxially around the aperture 46 and extends coaxially within the indent 18.

Then, as shown in FIG. 5, the second member portion 24 is engaged with the first member portion 22 such that the ends 42, 44 of the second member portion 24 fit inside the ends 38, 40 of the first member portion 22. This action moves the ends 38, 40, 42, 44 adjacent to one another, and into overlapping engagement. Moreover, the end surface 56 of the support tube 14 engages the support surface 64 of the second member portion 24, and the exterior surface 50 of the support tube 14 engages the indent 20. This secures the support tube 14 between the member portions 22, 24.

Lastly, the overlapping ends 38, 40, 42, 44 are rigidly secured to one another by welding so that the support tube 14 is rigidly secured within the frame member 12 without further operations or processing. The completed member assembly 10 may be removed from the fixture assembly 70 for use in the vehicle frame.

It should be understood that the frame member 12 illustrated is only exemplary, and the transverse cross-sectional configuration may be suitably varied to meet certain requirements for a particular vehicle. Regardless of the frame member configuration, opposing walls of the frame member may be pre-formed with indents as described above to secure a support tube within the hollow cavity of the frame member.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A method for forming a frame assembly, the method comprising:

providing a first portion having a first indent formed in surrounding relation with a first aperture, defining a first support surface therebetween, a second portion having a second indent formed in surrounding relation with a second aperture, defining a second support surface therebetween, and a support tube having an exterior surface;

engaging a first end surface of the support tube with the first support surface of the first portion;

engaging the first portion with the second portion so that a second end surface of the support tube engages with the second support surface of said second portion, the first and second indents engaging the exterior surface of the support tube to secure the support tube between the first and second portions and align the support tube with the first and second apertures; and connecting the first and second portions to one another to form a tubular member with said support tube within the tubular member.

2. The method according to claim 1, wherein the providing the first portion includes bending the first portion into a generally U-shaped configuration, and the providing the second portion includes bending the second portion into a generally U-shaped configuration.

3. The method according to claim 2, wherein each of the bending includes bending by a stamping operation.

4. The method according to claim 1, wherein the engaging the first portion with the second portion to connect the first and second portions to one another includes overlapping and engaging ends of the first portion with ends of the second portion.

5. The method according to claim 4, wherein the engaging the first portion with the second portion to connect the first and second portions to one another includes connecting the overlapped and engaged ends to one another by welding.

6. The method according to claim 1, wherein the providing the first portion includes forming the first indent by a stamping operation, and the providing the second portion includes forming the second indent by a stamping operation.

7. The method according to claim 1, wherein the engaging the first portion with the second portion to connect the first and second portions to one another occurs after the indent of the selected one of the first and second portions engages the exterior surface of the support tube.

8. The method according to claim 1, further comprising:
using a fixture pin to secure the support tube during the attaching of the first and second portions.

9. The method according to claim 1, further comprising:
inserting a fastener through said apertures and said support tube.

* * * * *